C. E. ADAMSON.
Wagon-Rack.

No. 198,235. Patented Dec. 18, 1877.

WITNESSES:
J. Wm Garner
R. M. Barr.

INVENTOR:
C. E. Adamson
per
J. A. Lehmann
Atty.

UNITED STATES PATENT OFFICE.

CHARLES E. ADAMSON, OF HUMBOLDT, NEBRASKA.

IMPROVEMENT IN WAGON-RACKS.

Specification forming part of Letters Patent No. 198,235, dated December 18, 1877; application filed November 15, 1877.

*To all whom it may concern:*

Be it known that I, CHARLES E. ADAMSON, of Humboldt, in the county of Richardson and State of Nebraska, have invented certain new and useful Improvements in Combined Racks for Wagons; and I do hereby declare the following to be a full, clear, and exact description of the invention, such as will enable others skilled in the art to which it pertains to make and use it, reference being had to the accompanying drawings, which form part of this specification.

My invention relates to an improvement in combined racks for wagons; and it consists in the arrangement and combination of parts that will be more fully described hereinafter, whereby the rack can be applied and adjusted in various positions for the different purposes that may be required of it.

Figure 1:
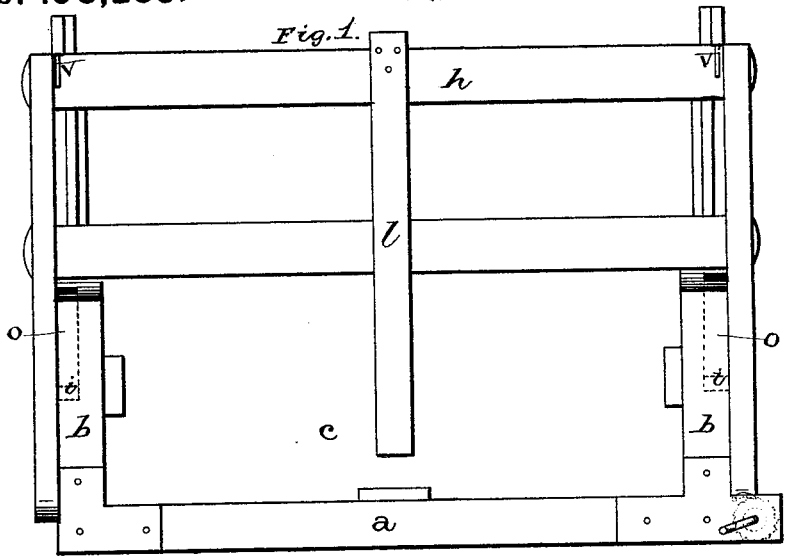
Figure 2:
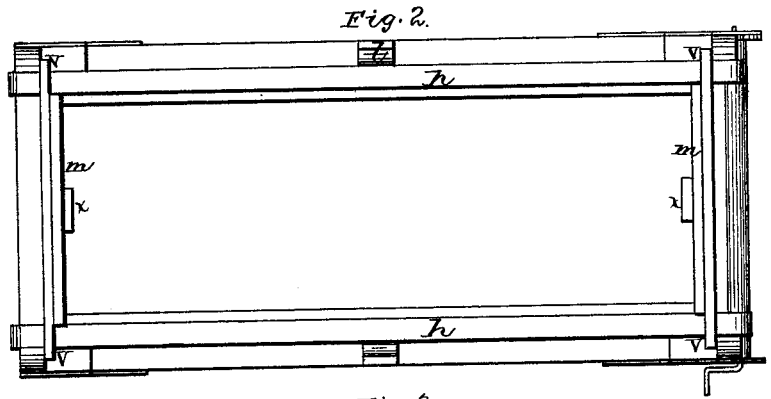
Figure 3:
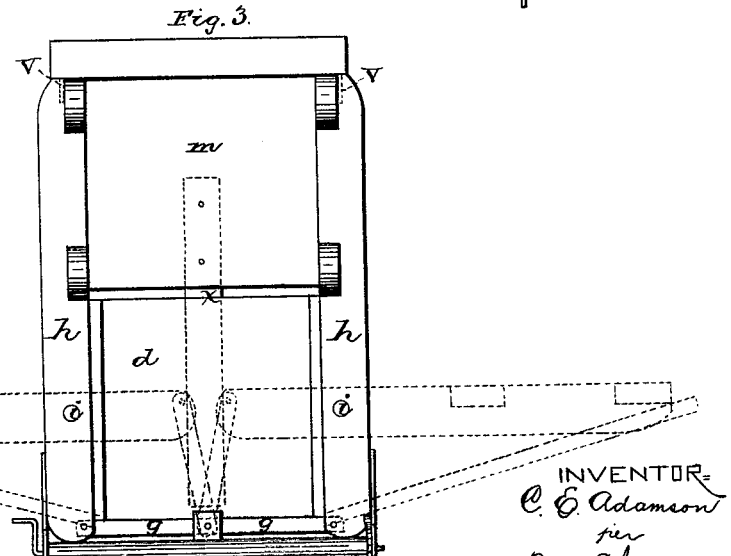

Figure 1 is a side elevation of my invention. Fig. 2 is a plan view of the same. Fig. 3 is an end view.

$a$ represents a rectangular frame, which has an upright post, $b$, at each corner. Inside of these four posts is placed the bed $c$, which is provided at its rear end with the hinged tail-board $d$. This bed is made removable, and is used for hauling small live stock and farm produce. In hauling wheat and such grain this bed catches all the grain that is shaken loose, and thus saves it from being lost. To the rear end of the frame is secured a roller, provided with a ratchet and pawl, for the purpose of fastening down the boom-pole. Pivoted to the center of each end of the frame are the two metallic straps $g$, which are fastened at their outer ends to the lower ends of the racks $h$. Projecting inward from the inner side of each end of both racks are the studs or projections $i$, which catch and move in the grooves $o$, made in the outer side of each one of the four posts $b$. Each of the racks is provided upon its outer side with the hinged brace or support $l$, the lower end of which rests upon the top of the frame $a$, as shown in dotted lines, and braces and supports the racks in position when they are extended outward, as shown in Fig. 3.

When it is desired that the racks shall extend vertically above the edges of the wagon-bed, they can be raised in that position, as shown in Figs. 1 and 3, and prevented from spreading outward, by means of the two end-boards $m$, which are provided with the hooks $v$ and the downward projection $x$ from its lower edge, so as to catch over the tops of each end of the bed and over the top of each one of the racks, as shown, and thus hold the racks rigidly in position. While the racks are thus held by the end-boards in a vertical position, the wagon may be used for the transportation of sheep, calves, and other such animals.

When it is desired to haul hay, straw, manure, and other such articles, the racks are extended outward, as shown by dotted lines in Fig. 3, and the bed is removed.

When it is desired to remove the rack from the wagon-bed, when not needed for active use, it is only necessary to remove the pivot-pin, upon which the metallic straps are pivoted, and then raise the racks outward, so that the studs or projections shall be lifted out of the grooves. In hauling stone, coal, lime, and such articles, the bed may be taken off, and only the bottom of the rack left.

By the above-described construction a rack that is cheap and simple in construction, and that is adapted to all purposes, is produced.

Having thus described my invention, I claim—

1. The frame $a$, provided with the grooved posts $b$, in combination with the racks having the studs or projections $i$, substantially as shown.

2. The combination of the metallic straps, the racks having the projections $i$, the grooved posts, and the braces for supporting the racks when extended, substantially as described.

3. The end-board $m$, provided with the hooks $v$ and downward projection $x$, so as to catch over the top edges of the end-boards of the wagon and over the tops of the racks, substantially as set forth.

In testimony that I claim the foregoing I have hereunto set my hand this 4th day of October, 1877.

CHARLES ELSWORTH ADAMSON.

Witnesses:
   JAMES ROUSER,
   FRED. ADAMSON.